US012739725B2

(12) United States Patent
Ashraf et al.

(10) Patent No.: US 12,739,725 B2

(45) Date of Patent: Sep. 15, 2026

(54) MOBILITY IN WIRELESS COMMUNICATION SYSTEMS

(71) Applicant: Nokia Technologies Oy, Espoo (FI)

(72) Inventors: Shehzad Ali Ashraf, Munich (DE); Panagiotis Spapis, Munich (DE); Frederic Ratovelomanana, Massy (FR); Umur Karabulut, Munich (DE); Halit Murat Gürsu, Munich (DE)

(73) Assignee: Nokia Technologies Oy, Espoo (FI)

( * ) Notice: Subject to any disclaimer, the term of this patent is extended or adjusted under 35 U.S.C. 154(b) by 295 days.

(21) Appl. No.: 18/582,158

(22) Filed: Feb. 20, 2024

(65) Prior Publication Data

US 2024/0292307 A1 Aug. 29, 2024

(30) Foreign Application Priority Data

Feb. 24, 2023 (GB) .................................... 2302714

(51) Int. Cl.
*H04W 36/32* (2009.01)
*H04W 36/04* (2009.01)

(52) U.S. Cl.
CPC ......... *H04W 36/324* (2023.05); *H04W 36/04* (2013.01)

(58) Field of Classification Search
CPC ............... H04W 36/324; H04W 36/04; H04W 36/0085; H04W 88/085; H04W 36/005; H04W 36/34

See application file for complete search history.

(56) References Cited

U.S. PATENT DOCUMENTS

2024/0114403 A1* 4/2024 Latheef ............. H04W 36/0061
2024/0284284 A1* 8/2024 Jin ...................... H04W 36/087
2024/0334263 A1* 10/2024 Zhang ............... H04W 36/0061
2024/0334270 A1* 10/2024 Zhang ............. H04W 36/00835
2025/0081052 A1* 3/2025 Chandrashekar ........................... H04W 36/0072
2025/0159561 A1* 5/2025 Mochizuki ........ H04W 36/0058
2025/0175864 A1* 5/2025 Kim .................. H04W 36/0077

(Continued)

FOREIGN PATENT DOCUMENTS

WO 2022/207078 A1 10/2022
WO 2023/285099 A1 1/2023

OTHER PUBLICATIONS

"3rd Generation Partnership Project; Technical Specification Group Radio Access Network; NG-RAN; F1 application protocol (F1AP) (Release 17)", 3GPP TS 38.473, V17.3.0, Dec. 2022, pp. 1-688.

(Continued)

*Primary Examiner* — Ayaz R Sheikh
*Assistant Examiner* — Mang Boi Thawng
(74) *Attorney, Agent, or Firm* — Robert P. Michal, Esq.; Rimon PC

(57) ABSTRACT

A communication network comprising distributed units for supporting radio coverage via a cell and for providing access to the cell to a user equipment and central units each controlling several distributed units. The distributed units comprise: mobility control circuitry configured: in response to receipt of layer 3 handover information for a user equipment from a central unit and where the mobility control circuitry has access to layer 1 measurements for the user equipment, to select a cell for a handover in dependence upon the layer 3 handover information and the layer 1 measurements.

19 Claims, 13 Drawing Sheets

(56) References Cited

U.S. PATENT DOCUMENTS

2025/0358696 A1* 11/2025 Zhang ............... H04W 36/0055
2025/0374134 A1* 12/2025 Kim .................. H04W 36/0072

OTHER PUBLICATIONS

"3rd Generation Partnership Project; Technical Specification Group Radio Access Network; NG-RAN; Architecture description (Release 17)", 3GPP TS 38.401, V17.3.0, Dec. 2022, pp. 1-125.
"38.300 running CR for introduction of NR further mobility enhancements", 3GPP TSG-RAN WG2 Meeting #120 Electronic, R2-2213292, MediaTek Inc., Nov. 14-18, 2022, 15 pages.
"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.
Search Report received for corresponding United Kingdom Patent Application No. 2302714.7, dated Sep. 1, 2023, 3 pages.
"Discussion on dynamic switch for L1/L2 mobility", 3GPP TSG-RAN WG2 Meeting #119bis-e, R2-2210172, ZTE Corporation, Oct. 10-19, 2022, 13 pages.
"Further discussion on L1/L2 mobility", 3GPP TSG-RAN WG3 #117bis-e, R3-225617, CATT, Oct. 10-18, 2022, 3 pages.
Extended European Search Report received for corresponding European Patent Application No. 24156663.7, dated Jul. 5, 2024, 8 pages.
"Discussion on dynamic switch for L1 L2 mobility", 3GPP TSG-RAN WG2 Meeting #119bis-e, R2-2209482, Agenda: 8.4.2.3, vivo, Oct. 10-19, 2022, 6 pages.
"Solutions to cell switch in LTM", 3GPP TSG-RAN WG2 Meeting #120, R2-2211642, Agenda: 8.4.2.3, Huawei, Nov. 14-18, 2022, 5 pages.
"Discussion on measurement related issues of L1/L2 mobility", 3GPP TSG-RAN WG2 Meeting #119bis electronic, R2-2209626, Agenda: 8.4.2.4, OPPO, Oct. 2022, 3 pages.

* cited by examiner

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| Candidate Cells For Handover List | | *(1 .. maxNoofCandidateCells)* | | | | |
| >Candidate Cell ID | M | | NR CGI 9.3.1.12 | | - | - |
| RRC Container (see Note-1) | O | | 9.3.1.6 | Includes the MeasurementReport message as defined in TS 38.331 | | |

Table 1 L3 Handover Information Message

FIG. 5

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| **Candidate Cell for LTM HO ID List** | | *(1 ..maxNoof Candidate forLTMCells)* | | The best cell is included first in decreasing order of the sorting quantity | | |
| > Candidate Cell for LTM HO ID | | | M NR CGI 9.3.1.12 | | | |
| > Cell Results | O | | | Measurement results sent by the UE to the gNB-DU lower layers | | |
| >> resultsSSB-Cell | O | | | SS/PBCH block based quantity(ies) in decreasing order of the sorting quantity, determined as specified in 5.5.5.3 in TS 38.331, i.e., the best best cell is included | | |
| >>> RSRP | O | | INTEGER (0.. 127, ...) | Integer value for RSRP measurements is according to Table 10.1.6.1-1 in TS 38.133 | | |
| >>> RSRQ | O | | INTEGER (0.. 127, ...) | Integer value for RSRQ measurements is according to Table 10.1.11.1-1 in TS 38.133 | | |
| >>> SINR | O | | INTEGER (0.. 127, ...) | Integer value for SINR measurements is according to Table 10.1.16.1-1 in TS 38.133 | | |

Table 2 (part 1)

FIG. 6

| IE/Group Name | Presence | Range | IE type and reference | Semantics description | Criticality | Assigned Criticality |
|---|---|---|---|---|---|---|
| >> resultsCSI-RS-Cell | O | | | CSI-RS based quantity(ies), in decreasing order of the sorting quantity, determined as specified in 5.5.5.3 in TS 38.331, i.e., the best cell is included first | | |
| >>> RSRP | O | | INTEGER (0.. 127, ...) | Integer value for RSRP measurements is according to Table 10.1.6.1-1 in TS 38.133 | | |
| >>> RSRQ | O | | INTEGER (0.. 127, ...) | Integer value for RSRQ measurements is according to Table 10.1.11.1-1 in TS 38.133 | | |
| >>> SINR | O | | INTEGER (0.. 127, ...) | Integer value for SINR measurements is according to Table 10.1.16.1-1 in TS 38.133 | | |

Table 2 (part 2) LTM Handover Required Message

FIG. 6 (Continued)

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| Cause | M | | 9.3.1.2 | | YES | ignore |
| Criticality Diagnostics | O | | 9.3.1.3 | | YES | ignore |

Table 3 LTM Handover Refuse Message

FIG. 7

| IE/Group Name | Presence | Range | IE Type and Reference | Semantics Description |
|---|---|---|---|---|
| CHOICE Cause Group | M | | | |
| >Radio Network Layer | | | | |
| >>Radio Network Layer Cause | | | M ENUMERATED (Unspecified, RL failure-RLC, ...Unknown or inconsistent pair of MBS F1AP ID, Unknown or inconsistent MRB ID, upper layer HO preparation | |

Table 4 Cause IE

FIG. 8

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| Candidate Cell for LTM HO ID | M | | NR CGI 9.3.1.12 | | | |

Table 5 LTM Handover Confirm Message

FIG. 9

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| LTM HO status | M | | ENUMERATED (execution resume, execution cancel, not initiated,...) | LTM HO status can only be set to 'not initiated' | YES | Ignore |

Table 6 LTM Handover Information

FIG. 10

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| ... | ... | ... | ... | ... | ... | ... |
| **LTM Modification Request** | O | | | | YES | reject |
| >Candidate Cells For Handover List | | | *(1 .. maxNoofCandidateCells)* | | | |
| >>Candidate Cell ID | M | | NR CGI 9.3.1.12 | | - | - |
| >RRC Container (see Note-2) | O | | 9.3.1.6 | Includes the MeasurementReport message as defined in TS 38.331 | | |

Table 7 LTM Modification Request IE

FIG. 11

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| ... | ... | ... | ... | ... | ... | ... |
| **LTM Modification Response** | O | | | | YES | reject |
| >LTM HO status | M | | ENUMERATED (execution resume, execution cancel, not initiated,...) | | | |

Table 8 LTM Modification Response IE

FIG. 12

MOBILITY IN WIRELESS COMMUNICATION SYSTEMS

TECHNOLOGICAL FIELD

Various example embodiments relate to wireless communication systems, and more particularly, to facilitating mobility within such wireless communication systems.

BACKGROUND

As a user equipment (UE) moves through a wireless communication system, it may move through cells that comprise regions of radio coverage that are supported by one or more network access nodes. Maintaining an ability for a UE to communicate effectively with the wireless communication system as it moves through regions of radio coverage is typically referred to as mobility. Layer 1 or layer 2, sometimes termed lower layer triggered mobility is being increasingly considered to reduce the latency, overhead and interruption time associated with a UE moving between the different cells. Potential problems associated with lower layer triggered mobility is that as the measurements used are lower layer measurements that are not averaged over time a non-ideal cell may be selected.

BRIEF SUMMARY

The scope of protection sought for various example embodiments of the invention is set out by the independent claims. The example embodiments and features, if any, described in this specification that do not fall under the scope of the independent claims are to be interpreted as examples useful for understanding various embodiments of the invention.

According to various, but not necessarily all, example embodiments of the invention there is provided a distributed unit of an access network node, said distributed unit being for supporting radio coverage via a cell and for providing access to said cell to a user equipment, said distributed unit comprising: mobility control circuitry configured: in response to receipt of layer 3 handover information for a user equipment, from a central unit of said access network and where said mobility control circuitry has access to layer 1 measurements for said user equipment, to select a cell for a handover in dependence upon said layer 3 handover information and said layer 1 measurements.

In some example embodiments, said layer 3 handover information for said user equipment is received as part of a UE context modification request.

In some example embodiments, said layer 3 handover information comprises a plurality of identifiers identifying candidate cells.

In some example embodiments, said plurality of identifiers comprise a list of identifiers.

In some example embodiments, said layer 3 handover information further comprises measurement information for said candidate cells.

In some example embodiments, said mobility control circuitry is configured to determine whether there is at least one common cell that is indicated as a candidate cell from said layer 3 handover information and as a candidate cell from said layer 1 measurements and where so, to select one of said at least one common cells as said cell for said handover.

In some example embodiments, said mobility circuitry is configured in response to determining no common candidate cells from said layer 1 measurements and said layer 3 information, to select as a potential target cell one of said candidate cells from said layer 1 measurements; said distributed unit further comprising message generating circuitry, said message generating circuitry being configured in response to said mobility control circuitry selecting said potential target cell, to generate a message for transmission to said central unit, said message indicating that a lower layer handover to said potential target cell is requested.

In some example embodiments, said lower layer handover request comprises at least one identifier identifying at least one candidate cells for LTM and respective at least one layer 1 measurement results.

In some example embodiments, said at least one candidate cell is one preferred candidate cell.

In some example embodiments, said lower layer handover request is transmitted as part of a UE context modification required request.

In some example embodiments, said lower layer handover request is transmitted as a LTM handover required request.

In some example embodiments, said mobility control circuitry is configured, in response to receipt of a message indicating handover has been accepted from said central unit, to select said potential target cell as said cell for said handover.

In some example embodiments, said mobility control circuitry is configured, in response to receipt of a message indicating handover has been refused from said central unit, to not select said potential target cell for said handover.

In some example embodiments, said distributed unit further comprises message generating circuitry, said message generating circuitry being configured in response to said mobility control circuitry selecting a cell for said handover, to generate a control command to trigger handover to said selected cell for transmission to said user equipment.

In some example embodiments, when the DU is proceeding with LTM the DU may indicate this to the CU by said message generation circuitry generating a message indicating lower layer handover is resumed for said user equipment, for transmission to said central unit.

In some example embodiments, said indication that lower layer handover is resumed is transmitted as an information element as part of a UE context modification response.

In some example embodiments, where LTM is not to be initiated said DU may indicate this to the CU by said message generation circuitry generating a message indicating lower layer handover execution is cancelled for said user equipment, for transmission to said central unit.

In some example embodiments, said indication that lower layer handover execution is cancelled is transmitted as an information element as part of a UE context modification response.

In some example embodiments, said mobility control circuitry is configured where said mobility control circuitry does not have access to layer 1 measurements for said user equipment, to control message generating circuitry to generate a message indicating lower layer triggered mobility is not initiated for said user equipment.

In some example embodiments, said indication that lower layer triggered mobility is not initiated is transmitted as an information element as part of a UE context modification response.

According to various, but not necessarily all, example embodiments of the invention there is provided a central unit for controlling a plurality of distributed units comprising: determining circuitry configured to determine from layer 3 user equipment measurement information, candidate cells for a cell handover for said user equipment; message generating circuitry configured to generate a message for transmission to a distributed unit supporting a cell providing radio coverage to said user equipment, said message comprising information relating to said cell handover; and transmitting circuitry configured to transmit said message to said distributed unit.

In some example embodiments, said user equipment measurement information is received from said distribution unit.

In some example embodiments, said handover information for said user equipment comprises layer 3 handover information and is received as part of a UE context modification request.

In some example embodiments, said layer 3 handover information comprises a plurality of identifiers identifying candidate cells.

In some example embodiments, said plurality of identifiers comprise a list of identifiers.

In some example embodiments, said layer 3 handover information further comprises measurement information for said candidate cells.

In some example embodiments, said message generating circuitry is configured to generate said message in response to at least one of the following: said determining circuitry at said central unit detecting a condition for triggering a layer 3 handover; a predetermined time having elapsed; and said central unit detecting an internal trigger for said message generation during preparation steps performed for preparing lower layer triggered mobility for said user equipment.

In some example embodiments, said determining circuitry is responsive to receipt of a lower layer triggered mobility required message received from said distributed unit, to determine whether to allow a lower layer triggered handover or whether to refuse a lower layer handover; and said message generating circuitry is configured to generate a respective one of a lower layer triggered handover refused or a lower layer handover confirmed message.

In some example embodiments, said central unit further comprising mobility control circuitry, said mobility control circuitry being responsive to said determining circuitry determining to refuse said lower layer triggered handover to initiate layer 3 handover preparations.

In some example embodiments, where said determining circuitry determines to allow a lower layer triggered handover, said central unit is configured to cancel layer 3 handover.

In some example embodiments, said lower layer mobility required request comprises at least one identifier for at least one candidate cell for said lower layer triggered mobility and a respective at least one layer 1 measurement report for said at least one cell, said determining circuitry being configured to determine in dependence upon said layer 1 measurement reports and layer 3 measurement reports a target cell for said handover.

In some example embodiments, said at least one identifier comprises one identifier identifying a preferred candidate cell from said layer 1 measurements and said respective layer one measurement.

In some example embodiments, said mobility control circuitry is configured in response to a message indicating receipt of a lower layer triggered mobility is not initiated for said user equipment to initiate layer 3 handover preparations.

In some example embodiments, said mobility control circuitry is configured to initiate layer 3 handover preparations by controlling said message generating circuitry to generate a layer 3 handover command for triggering cell change at said user equipment.

According to various, but not necessarily all, example embodiments of the invention there is provided according to one aspect, a method performed by distributed unit of an access network node, said distributed unit being for supporting radio coverage via a cell and for providing access to said cell to a user equipment, said method comprising: receiving layer 3 handover information for a user equipment, from a central unit of said access network and where said distributed unit has access to layer 1 measurements for said user equipment, selecting a cell for a handover in dependence upon said layer 3 handover information and said layer 1 measurements.

In some example embodiments of one aspect, said step of receiving said layer 3 handover information for said user equipment comprises receiving a UE context modification request.

In some example embodiments of one aspect, said method comprises determining whether there is at least one common cell that is indicated as a candidate cell from said layer 3 handover information and as a candidate cell from said layer 1 measurements and where so, selecting one of said at least one common cells as said cell for said handover.

In some example embodiments of one aspect, said method comprises in response to determining no common candidate cells from said layer 1 measurements and said layer 3 information, selecting as a potential target cell one of said candidate cells from said layer 1 measurements; and generating a message for transmission to said central unit, said message indicating that a lower layer handover to said potential target cell is requested.

In some example embodiments of one aspect, said method comprises in response to receipt of a message indicating handover has been accepted from said central unit, selecting said potential target cell as said cell for said handover.

In some example embodiments of one aspect, said method comprises in response to receipt of a message indicating handover has been refused from said central unit, not selecting said potential target cell for said handover.

In some example embodiments of one aspect, said method comprises selecting a cell for said handover and generating a control command to trigger handover to said selected cell for transmission to said user equipment.

In some example embodiments of one aspect, said method comprises generating a message indicating lower layer handover is resumed for said user equipment, for transmission to said central unit.

In some example embodiments of one aspect, said method comprising not initiating LTM and generating a message indicating lower layer handover execution is cancelled for said user equipment, for transmission to said central unit.

In some example embodiments of one aspect, said method comprises in response to not having access to layer 1 measurements for said user equipment, generating a message indicating lower layer triggered mobility is not initiated for said user equipment.

In some example embodiments of one aspect, said indication that lower layer triggered mobility is not initiated is transmitted as an information element as part of a UE context modification response.

According to various, but not necessarily all, example embodiments of the invention there is provided according to a further aspect a method performed at a central unit for controlling a plurality of distributed units comprising: determining from layer 3 user equipment measurement information, candidate cells for a cell handover for said user equipment; generating a message for transmission to a distributed unit supporting a cell providing radio coverage to said user equipment, said message comprising information relating to said cell handover; and transmitting said message to said distributed unit.

In some example embodiments of the further aspect, said method comprises generating said message in response to at least one of the following: said determining circuitry at said central unit detecting a condition for triggering a layer 3 handover; a predetermined time having elapsed; and detecting an internal trigger for said message generation during preparation steps performed for preparing lower layer triggered mobility for said user equipment.

In some example embodiments of the further aspect, said method comprises in response to receipt of a lower layer triggered mobility required message received from said distributed unit, determining whether to allow a lower layer triggered handover or whether to refuse a lower layer handover; and generating a respective one of a lower layer triggered handover refused or a lower layer handover confirmed message.

In some example embodiments of the further aspect, said method further comprises in response to said determining circuitry determining to refuse said lower layer triggered handover to initiate layer 3 handover preparations.

In some example embodiments of the further aspect, said method comprises allowing a lower layer triggered handover and cancelling layer 3 handover.

In some example embodiments of the further aspect, said lower layer mobility required request comprises at least one identifier for at least one candidate cell for said lower layer triggered mobility and a respective at least one layer 1 measurement report for said at least one cell, said step of determining comprising determining in dependence upon said layer 1 measurement reports and layer 3 measurement reports a target cell for said handover.

In some example embodiments of the further aspect, said method comprises in response to a message indicating receipt of a lower layer triggered mobility is not initiated for said user equipment initiating layer 3 handover preparations.

In some example embodiments of the further aspect, said method comprises initiating layer 3 handover preparations by generating a layer 3 handover command for triggering cell change at said user equipment.

According to various, but not necessarily all, example embodiments of the invention there is provided a distributed unit of an access network node, said distributed unit being for supporting radio coverage via a cell and for providing access to said cell to a user equipment, said distributed unit comprising at least one processor; and at least one memory storing instructions that, when executed by the at least one processor, cause said distributed unit to:

receive layer 3 handover information for a user equipment, from a central unit of said access network and where said distributed unit has access to layer 1 measurements for said user equipment, to select a cell for a handover in dependence upon said layer 3 handover information and said layer 1 measurements In some example embodiments, said distributed unit is further caused to: perform a method according to one aspect.

According to various, but not necessarily all, example embodiments of the invention there is provided a central unit of an access network node said central unit being for controlling a plurality of distributed units, said central unit comprising at least one processor; and at least one memory storing instructions that, when executed by the at least one processor, cause said central unit to:

determine from layer 3 user equipment measurement information, candidate cells for a cell handover for said user equipment;

generate a message for transmission to a distributed unit supporting a cell providing radio coverage to said user equipment, said message comprising information relating to said cell handover; and transmitting said message to said distributed unit.

In some example embodiments, said central unit is further caused to perform a method according to a further aspect.

According to various, but not necessarily all, example embodiments of the invention there is provided a distributed means of an access network node, said distributed unit being for supporting radio coverage via a cell and for providing access to said cell to a user equipment, said distributed means comprising: receiving means for receiving layer 3 handover information for a user equipment from a central unit of said access network and for receiving layer 1 measurements for a user equipment; and mobility control means for selecting a cell for a handover in dependence upon said layer 3 handover information and said layer 1 measurements where said receiving means has received said layer 1 measurements.

In some example embodiments, said mobility control circuitry described earlier comprises mobility control means and said message generating circuitry comprises means for generating messages, According to various, but not necessarily all, example embodiments of the invention there is provided a central means for controlling a plurality of distributed means comprising: determining means for determining from layer 3 user equipment measurement information, candidate cells for a cell handover for said user equipment; message generating means for generating a message for transmission to a distributed unit supporting a cell providing radio coverage to said user equipment, said message comprising information relating to said cell handover; and transmitting means for transmitting said message to said distributed unit.

In some example embodiments, said determining circuitry described earlier comprises means for determining and said transmitting circuitry comprises means for transmitting.

According to various, but not necessarily all, example embodiments of the invention there is provided a non-transitory computer readable medium comprising program instructions stored thereon for performing at least the following:

in response to receipt of layer 3 handover information for a user equipment, from a central unit of an access network and where said computer program has access to layer 1 measurements for said user equipment, selecting a cell for a handover in dependence upon said layer 3 handover information and said layer 1 measurements.

According to various, but not necessarily all, example embodiments of the invention there is provided a non-transitory computer readable medium comprising program instructions stored thereon for performing at least the following:

determining from layer 3 user equipment measurement information, candidate cells for a cell handover for said user equipment;

generating a message for transmission to a distributed unit supporting a cell providing radio coverage to said user equipment, said message comprising information relating to said cell handover; and transmitting said message to said distributed unit.

According to various, but not necessarily all, example embodiments of the invention there is provided computer program comprising computer readable instructions which when executed by a processor on a distributed unit are operable to cause said distributed unit to perform a method according to one aspect.

According to various, but not necessarily all, example embodiments of the invention there is provided a computer program comprising computer readable instructions which when executed by a processor on a distributed unit are operable to cause said distributed unit to perform a method according to a further aspect.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Some example embodiments will now be described with reference to the accompanying drawings in which:

FIG. 5 shows table 1 and indicates properties of the L3 handover information message;

FIG. 6 shows table 2 and indicates properties of the LTM handover required message;

FIG. 7 shows table 3 and indicates properties of the LTM handover refuse message;

FIG. 8 shows table 4 and indicates properties of the Cause IE;

FIG. 9 shows table 5 and indicates properties of the LTM handover confirm message;

FIG. 10 shows table 6 and indicates properties of the LTM handover information message;

FIG. 11 shows table 7 and indicates properties of the UE context modification request message;

FIG. 12 shows table 8 and indicates properties of the LTM context modification response message.

DETAILED DESCRIPTION

Before discussing the example embodiments in any more detail, first an overview will be provided.

Figure 1:
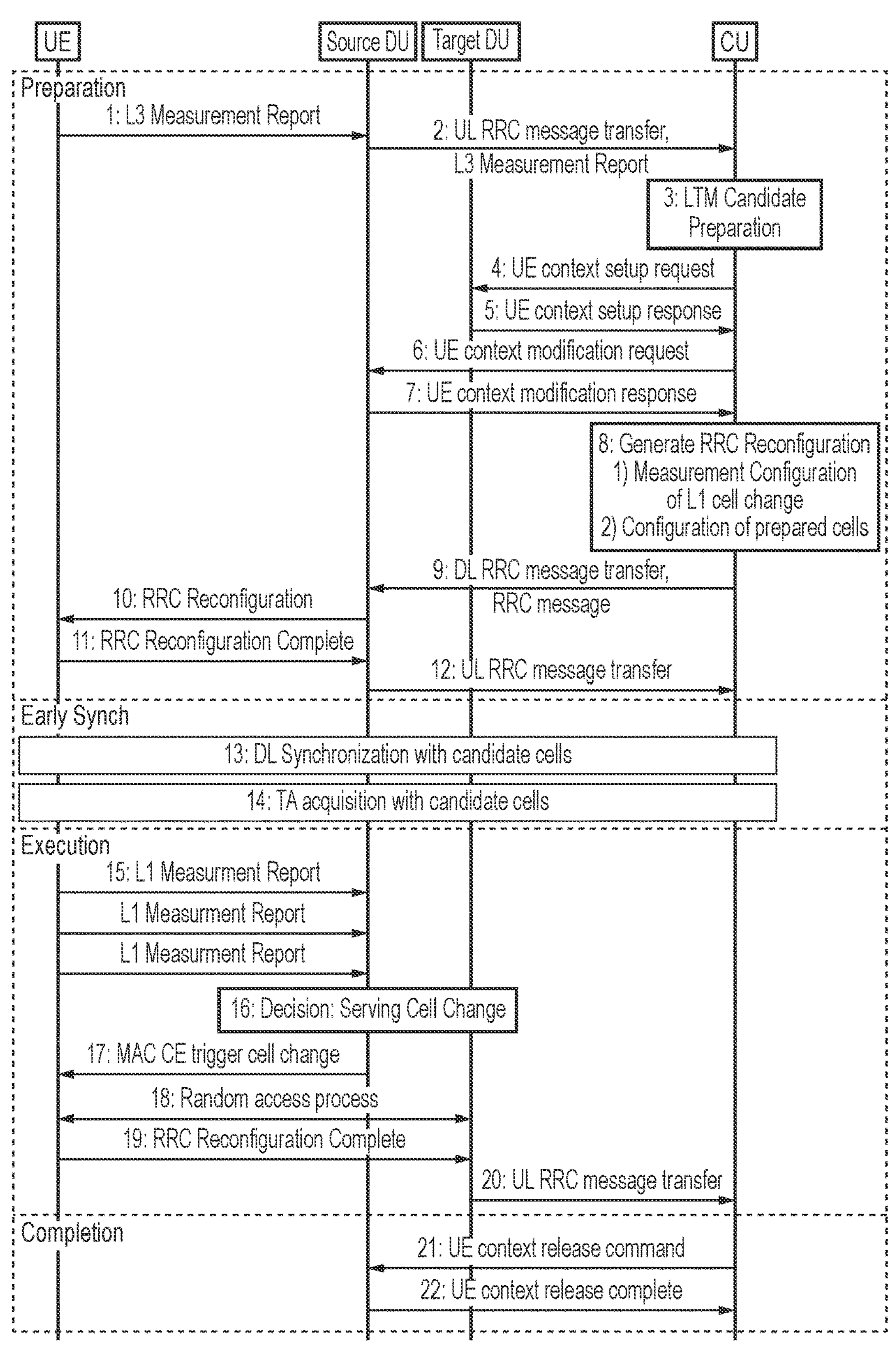
FIG. 1 illustrates a signalling diagram for the LTM procedure for a network using CU-DU split architecture.

An example of a lower layer or L1/2 Triggered Mobility procedure is provided in FIG. 1. Herein, the UE is served by a cell under the source DU. The target cell is under the target DU. It is to be noted that the target DU and the source DU can be the same entity (i.e., both serving and target cell can be under the same DU, aka. Intra-DU scenario). However, the intra-DU scenario is not shown in FIG. 1. It is further to be noted that in the example of FIG. 1 the DUs are under the same CU. According to that:

- Steps 1-3: The UE sends a L3 Measurement Report message to the CU via the Source DU. The CU decides to use LTM and initiates LTM candidate cells preparation.
- Steps 4-5: The CU sends a UE context setup request to the target DU for the preparation of the target cells
- Steps 6-7: The CU sends a UE modification setup request to the source DU for the preparation of the target cells in the source DU. Additionally this message may be used for the provision of target cell information in the Source DU.
- Steps 8-12: The CU prepares the RRC Configuration and provides it to the UE. The UE stores the configuration of LTM candidate target cell(s) and transmits a RRCReconfigurationComplete message to the CU.
- Steps 13-14: The UE may perform DL synchronization and TA acquisition with candidate target cell(s) before receiving the LTM cell switch command.
- Step 15: The UE performs L1 measurements on the configured LTM candidate target cell(s), and transmits lower-layer measurement reports to the source DU.
- Step 16-17: The source DU decides to execute LTM cell switch to a target cell, and transmits a MAC CE triggering LTM cell switch
- Step 18: The UE switches to the configuration of the LTM candidate target cell and accesses the target cell. If needed (i.e., if Timing Advance is not available/valid) it performs Random Access.
- Steps 19-20: The UE indicates successful completion of the LTM cell switch towards target cell using an RRC Reconfiguration complete.
- Steps 21-22: UE context is released if the CU decides accordingly.

For L1/L2-triggered mobility (LTM), the LTM decision is made by the gNB-DU. The LTM decision is based solely on L1 measurements reports and this may lead to the following problems:

- L1 measurements reports are unfiltered reports such that the channel impairments (fast fading, shadow fading, etc.) which results in the measured L1 RSRP values to be fluctuating significantly. This issue is more pronounced in FR2 (high frequency band) scenarios where the measured signal fluctuates significantly in the higher carrier frequencies. Handover decision based on unstable L1 RSRP measurements may lead to ping-pongs or a handover to a non-preferred cell (i.e. a cell may appear to be a suitable target cell, but only for a short period of time); which eventually leads to unnecessary or wrong handovers.
- Additionally, in case of misconfigurations, e.g., L1 handover decision may be triggered using different thresholds than L3 events. And the two events (i.e., L1 event and L3 event) may be triggered at the same time.

In case when both L1/L2-triggered mobility and L3 based mobility are configured simultaneously, the current specification does not have a procedure to enable efficient coexistence and reliable handover.

The application proposes that the DU makes the decision based on its own configuration, but while considering additional L3 measurements information. The DU then informs the CU about the HO decision and CU sends F1AP Message, providing the L1 measurements.

Thus, according to embodiments, the DU makes the decision and proceeds with either L1 or L3 handover, this provides a decreased interruption time, and the paradigm of LTM as agreed in 3GPP and described with respect to FIG. 1 is followed.

In embodiments use is made of L3 measurements and CU decision in order to assist the LTM decision at the DU side. This has an advantage of increasing the LTM robustness (i.e., avoiding wrong cell selection based on unfiltered L1 measurements)

In summary embodiments provide one or more of the following:

When initiating the L3 handover, the gNB-CU sends to the gNB-DU the necessary information before triggering the L3 handover preparation towards the target cell.

This information, referred to in this invention as L3 HO information, may include at least one or all of the following:

- Either the list of candidate target cells for L3 handover (i.e., TS 38.331 IE measResultListNR) received as a part of TS 38.331 IE MeasResults from UE via an RRC container sent from gNB-DU to gNB-CU
- A subset from the list of candidate target cells extracted from TS 38.331 IE MeasResults received from UE
- For example, the gNB-CU can provide the gNB-DU with information (e.g., NR Cell Identity or physical cell ID) about the L3-based strongest cell or multiple cells sorted by RSRP/RSRQ with the L3-based strongest cell being the first.
- The gNB-DU decides to trigger LTM based on both L1 measurements received from the UE and the L3 HO information received from the gNB-CU.
- The gNB-DU defines a common set of neighbouring cells between L1 measurements and L3 HO information received from the gNB-CU. The common set may consist of a single cell or multiple cells.
- The gNB-DU triggers a LTM handover to a cell selected from this common set.

The advantages of embodiments may include:

A more robust decision to trigger an LTM handover which is reinforced by L3 measurements is provided.

The gNB-DU is prevented or at least impeded from choosing a wrong cell for the LTM handover, because the gNB-DU's choice is not solely based on unfiltered L1 measurement reports.

Embodiments provide three cases that can occur when the gNB-DU compares the L1 measurements with the L3 HO information.

- Case 1—A common cell according to L1 measurements and L3 HO information.
- Case 2—No common cell according to L1 measurements and L3 HO information.
- Case 2a—Unsuccessful DU-initiated LTM handover procedure.
- Case 2b—Successful DU-initiated LTM handover procedure.
- Case 3—L3 HO information with no L1 measurements.

Figure 2:
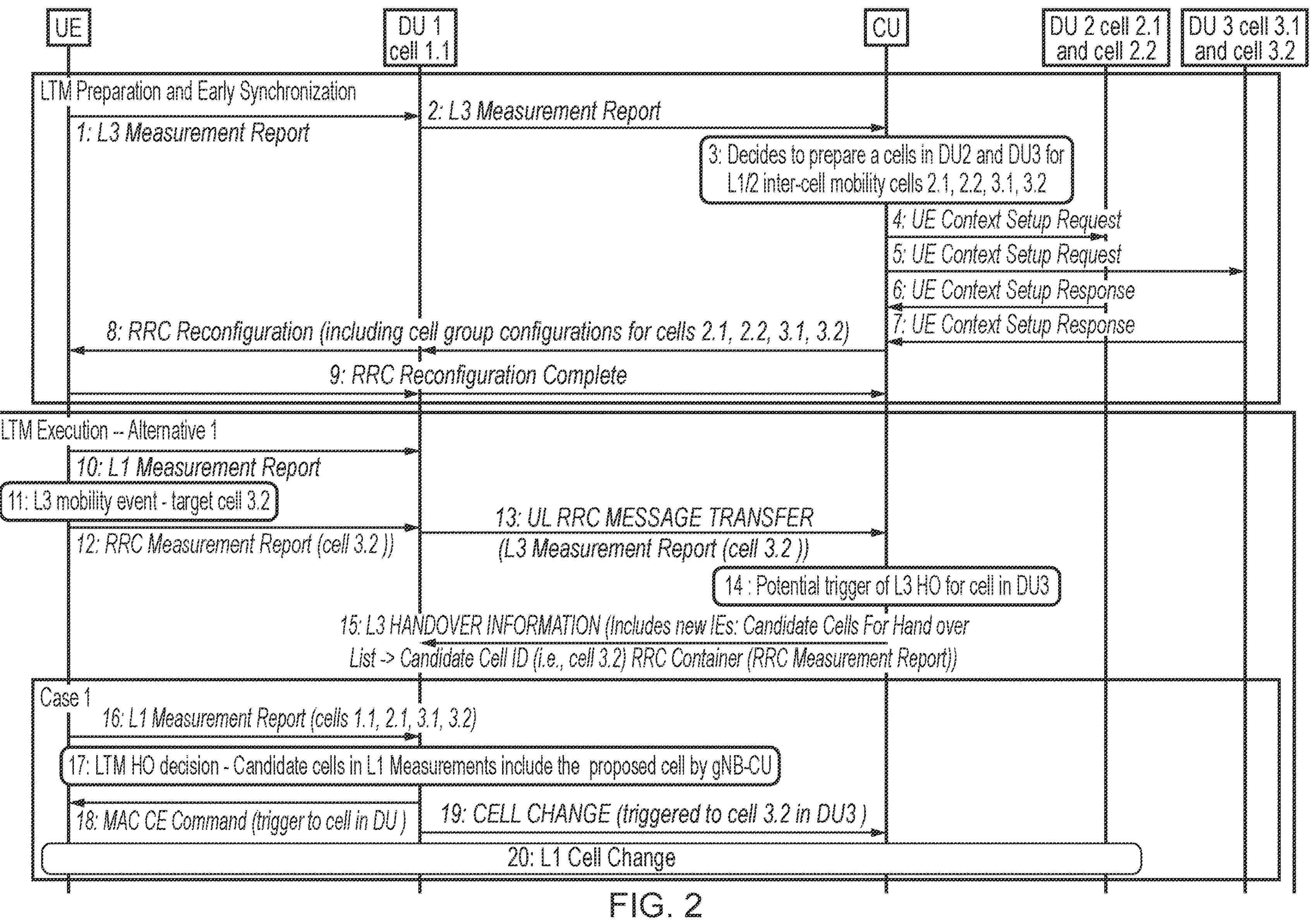
FIG. 2 illustrates a signalling diagram for the LTM procedure according to an embodiment.
Figure 2:
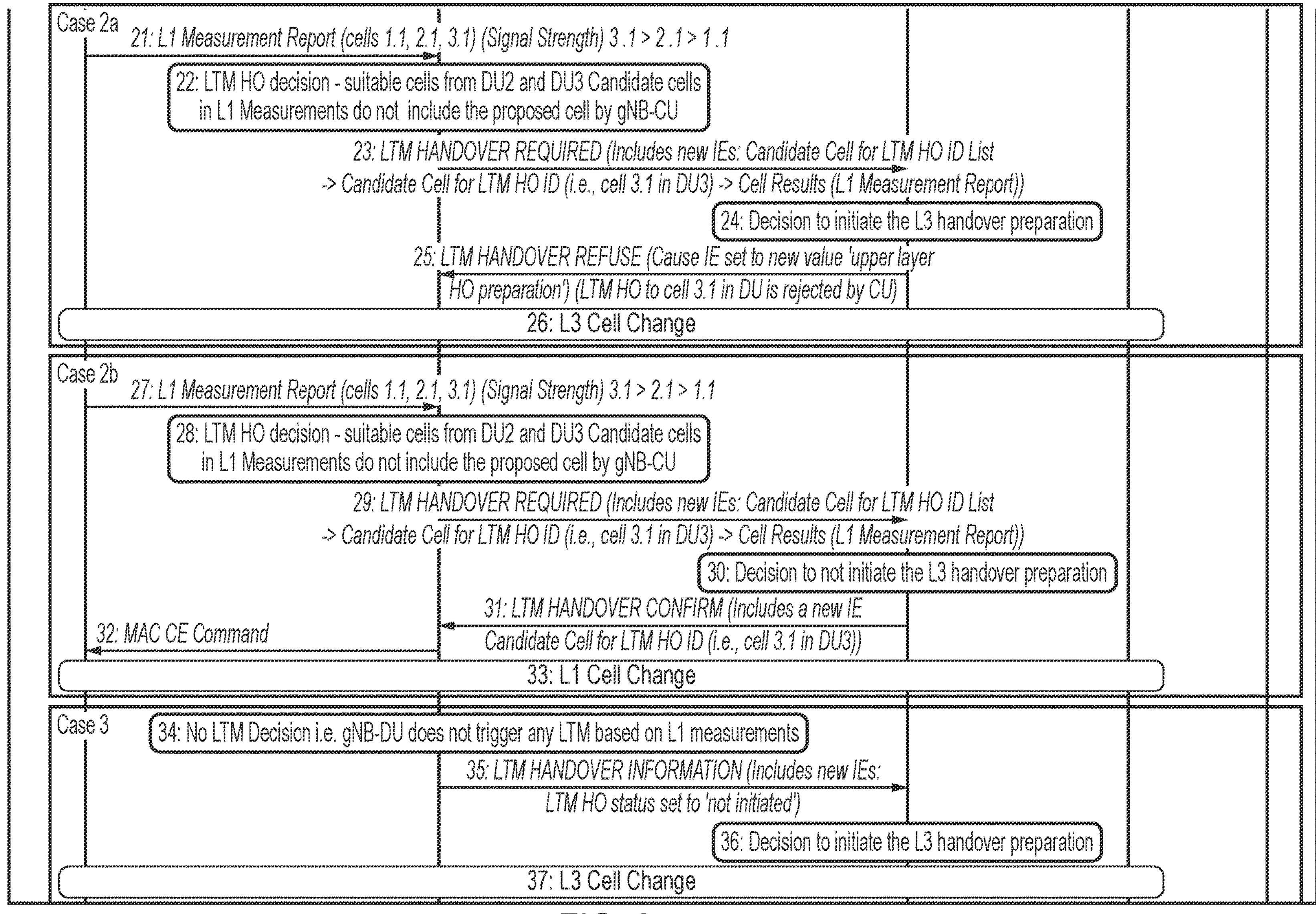

The above cases lead to possible impacts on F1AP procedures (signalling between the gNB-CU and the gNB_DU) and new F1AP messages which are described below in three different alternatives:

FIG. 2 shows the signalling flow for the first alternative whereby the new signalling required for embodiments is provided on new F1AP messages between the DU and CU.

Alternative 1: Call Flow Description

Four cases can occur when the gNB-DU compares the L1 measurements received from the UE with the L3 HO information received from the gNB-CU.

The four cases start when the gNB-DU receives the L3 HANDOVER INFORMATION message from the gNB-CU, step 15. This message includes L3 HO information. The L3 HO information comprises the Candidate Cells For Handover List IE as a list of candidate cells for the handover triggered by the upper layers in the gNB-CU. The L3 HO information may also comprise an RRC Container IE which includes the MeasurementReport reported by the UE (in step 12 of FIG. 3). Subsequently, the procedure for the four identified cases are as follows:

Case 1—A common cell according to L1 measurements and L3 HO information is found, in this case:

At step 16, the gNB-DU receives the L1 Measurement Report from the UE including the L1 measurements. The L1 measurements are reported by the UE for one or more cells. The L1 measurements may comprise RSRP, RSRQ or SINR measurements.

At step 17, the gNB-DU retrieves one or more cells common to L1 measurements and L3 HO information.

At step 18, the gNB-DU sends a MAC CE command to the UE triggered to this common cell.

At step 19, the gNB-DU sends a CELL CHANGE message to the gNB-CU triggered to this common cell.

At step 20, the L1 Cell Change procedure is initiated.

Case 2—No common cell according to L1 measurements and L3 HO information is found:

Case 2a—Unsuccessful DU-initiated LTM handover procedure.

At step 21, the gNB-DU receives the L1 Measurement Report from the UE including the L1 measurements. The L1 measurements are reported by the UE for one or more cells. The L1 measurements may comprise RSRP, RSRQ or SINR measurements.

At step 22, the gNB-DU cannot retrieve any cell common to L1 measurements and L3 HO information.

At step 23, the gNB-DU sends the LTM HANDOVER REQUIRED message to the gNB-CU to transfer information related to the handover triggered by the lower layers in the gNB-DU. This message includes the Candidate Cell for LTM HO ID List IE. The gNB-CU should consider the Candidate Cell For LTM HO ID List IE included in the LTM HANDOVER REQUIRED message as a list of candidate cells for the handover triggered by the lower layers in the gNB-DU. These cells are identified by the included NR CGIs (new radio cell global identities). The gNB-DU may send for each candidate cell the Cell Results IE including the L1 measurements relevant to this candidate cell as received from UE.

At step 24, upon reception of the LTM HANDOVER REQUIRED message and if the L1 measurements are present, the gNB-CU may compare these with the L3 measurements included in the RRC MeasurementReport message that is received from the UE (step 1). The gNB-CU also uses the Candidate Cell for LTM HO ID List IE included in LTM HANDOVER REQUIRED message. The gNB-CU decides to proceed with the L3 handover instead of the LTM handover and therefore to initiate the L3 handover preparation.

At step 25, the gNB-CU sends the LTM HANDOVER REFUSE message to the gNB-DU including the Cause IE set to 'upper layer HO preparation'.

At step 26, the L3 handover procedure initiated during step 24 continues. Case 2b-Successful DU-initiated LTM handover procedure.

At step 27, the gNB-DU receives the L1 Measurement Report as in step 21.

At step 28, the gNB-DU cannot retrieve any cell common to L1 measurements and L3 HO information as in step 22.

At step 29, the gNB-DU sends the LTM HANDOVER REQUIRED message to the gNB-CU as in step 23.

At step 30, upon reception of the LTM HANDOVER REQUIRED message and if the L1 measurements are present, the gNB-CU may compare these with the L3 measurements included in the RRC MeasurementReport message that is received from the UE (step 1). The gNB-CU also uses the Candidate Cell for LTM HO ID List IE included in LTM HANDOVER REQUIRED message. The gNB-CU decides to proceed with the LTM handover instead of the L3 handover and therefore to not initiate the L3 handover preparation.

At step 31, the gNB-CU sends the LTM HANDOVER CONFIRM message to the gNB-DU including the Candidate Cell For LTM HO ID IE set as the NR CGI of the candidate cell selected by the gNB-CU for the handover triggered by the L1 layers in the gNB-DU. The gNB-DU shall consider that the gNB-CU used the L1 information in the LTM HANDOVER REQUIRED message not to initiate the preparation of a L3 handover.

At step 32, the gNB-DU sends a MAC CE command to the UE triggered to the cell identified by the NR CGI included in the LTM HANDOVER CONFIRM message.

At step 33, the L1 Cell Change procedure is initiated.

Case 3—L3 HO information with no L1 measurements

At step 34, the gNB-DU has not received an L1 Measurement Report with L1 measurements from the UE.

At step 35, the gNB-DU sends the LTM HANDOVER INFORMATION message to the gNB-CU to indicate that the LTM handover has not been initiated. This message includes the LTM HO status IE which is set to 'not initiated'.

Alternative 1: Impacts on F1AP Signalling

Below is the list of new F1AP messages in order to enable embodiments.

L3 HANDOVER INFORMATION

This message is sent by the gNB-CU and is used to transfer information related to the handover triggered by the upper layers in the gNB-CU.

Direction: gNB-CU to gNB-DU and illustrated in table 1 of FIG. 5.

The gNB-DU should use the Candidate Cells For Handover List IE included in the L3 HANDOVER INFORMATION message as a list of candidate cells for the handover triggered by the upper layers in the gNB-CU. The gNB-DU should use, if present, the RRC Container IE for the indication of measurement results by the upper layers at the UE. These cells are identified by the included NR CGIs. The gNB-DU should compare these cells with other cells reported by the lower layers for the handover triggered by the lower layers in the gNB-DU. The gNB-DU should use the RRC Container IE if present for this comparison.

Note-1: after the gNB-CU-CP receives the MeasurementReport message from the UE, two signalling formats are possible 1. The gNB-CU-CP sends the MeasurementReport message in an RRC Container IE which is then decoded by the gNB-DU or
2. The gNB-CU-CP decodes the MeasurementReport message and builds a Cell Results IE under the Candidate Cells For Handover List IE as described for the LTM HANDOVER REQUIRED message

LTM HANDOVER REQUIRED

This message is sent by the gNB-DU and is used to transfer information related to the handover triggered by the lower layers in the gNB-DU.

Direction: gNB-DU to gNB-CU. The properties of the message are shown in table 2 of FIG. 6

The gNB-CU should consider the Candidate Cell For LTM HO ID List IE included in the LTM HANDOVER REQUIRED message as a list of candidate cells for the handover triggered by the lower layers in the gNB-DU. These cells are identified by the included NR CGIs. The gNB-DU may send for each candidate cell the Cell Results IE including the lower layers measurements relevant to this candidate cell as received from UE so that the gNB-CU can compare these with the upper layers measurements that are received from the UE.

LTM HANDOVER REFUSE

This message is sent by the gNB-CU to indicate the request for the handover triggered by the lower layers in the gNB-DU was unsuccessful (i.e., not accepted by gNB-CU).

Direction: gNB-CU to gNB-DU. The properties of the messages are shown in table 3 in FIG. 7.

If the Cause IE included in the LTM HANDOVER REFUSE message is set to 'upper layer HO preparation', the gNB-DU shall consider the request for the handover triggered by the lower layers in the gNB-DU to be unsuccessful.

The purpose of the Cause IE is to indicate the reason for a particular event for the F1AP protocol and the properties of this IE are shown in table 4 in FIG. 8.

LTM HANDOVER CONFIRM

This message is sent by the gNB-CU to indicate the request for the handover triggered by the lower layers in the gNB-DU was successful (i.e., accepted by gNB-CU) and that the gNB-CU used the lower layers information in the LTM HANDOVER REQUIRED message to not initiate the preparation of a handover triggered by the upper layers.

Direction: gNB-CU to gNB-DU. The properties of this message are shown in table 5 in FIG. 9.

The gNB-CU shall set the Candidate Cell For LTM HO ID IE included in the LTM HANDOVER CONFIRM message as the NR CGI of the candidate cell selected for the handover triggered by the lower layers in the gNB-DU. The gNB-DU shall consider the gNB-CU used the lower layers information in the LTM HANDOVER REQUIRED message not to initiate the preparation of a handover triggered by the upper layers.

LTM HANDOVER INFORMATION

This message is sent by the gNB-DU to indicate that the handover request triggered by the lower layers of the gNB-DU has not been initiated.

Direction: gNB-DU to gNB-CU, the properties of this message are shown in table 6 in FIG. 10.

The gNB-CU should consider the Candidate Cell For LTM HO ID List IE included in the LTM HANDOVER REQUIRED message as a list of candidate cells for the handover triggered by the lower layers in the gNB-DU. These cells are identified by the included NR CGIs. The gNB-DU may send the lower layers measurements relevant to the candidate cells that are received from UE so that the gNB-CU can compare these with the upper layers measurements that are received from the UE.

Alternative 2: Reusing Existing F1AP Messages

There are two possible ways of reusing existing F1AP messages to implement embodiments. These are described below:

Alternative 2a: One Way of Reusing Existing F1AP Messages.

Figure 3:
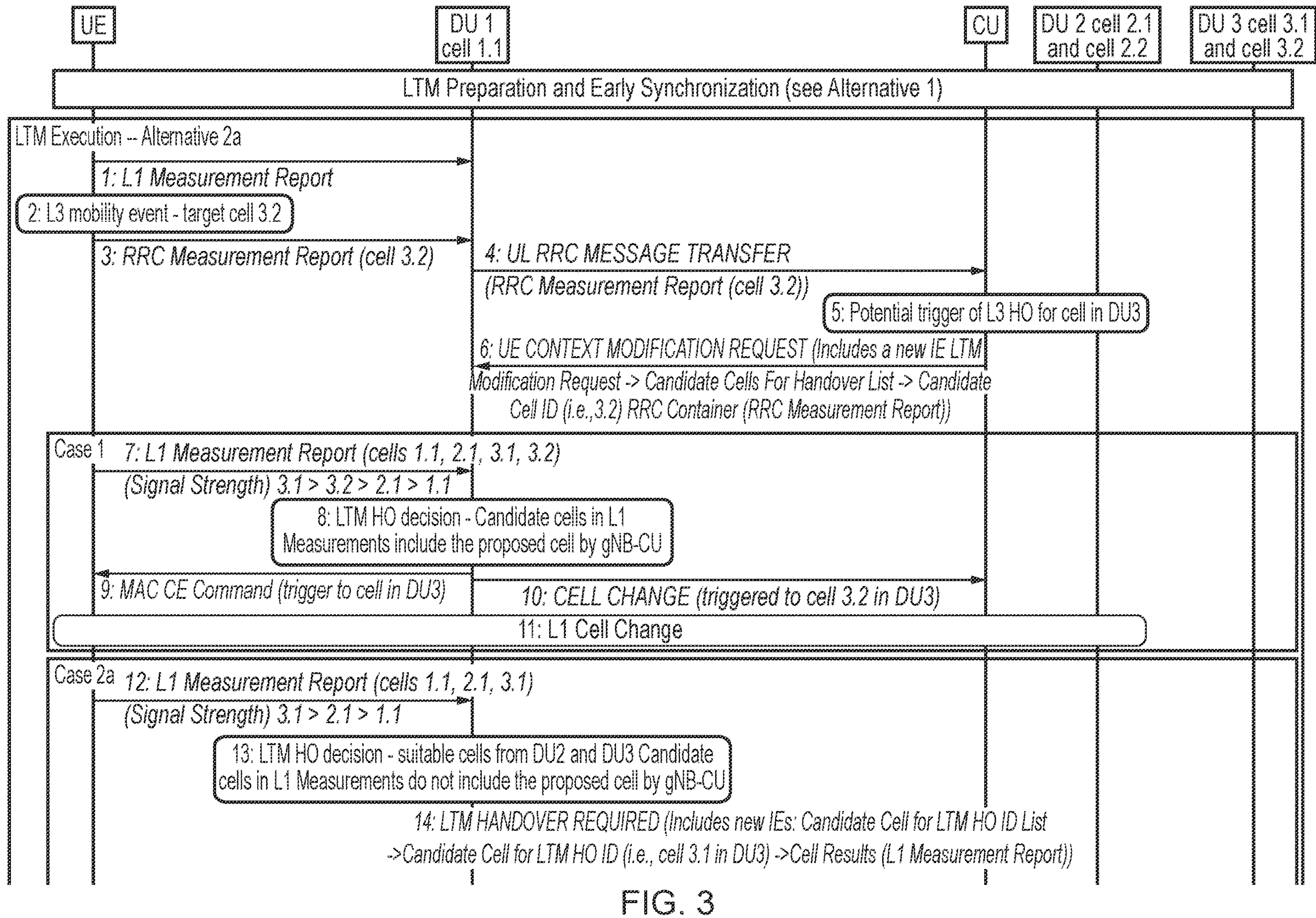
FIG. 3 illustrates a signalling diagram for the LTM procedure that reuses existing f1AP messages according to one embodiment.
Figure 3:
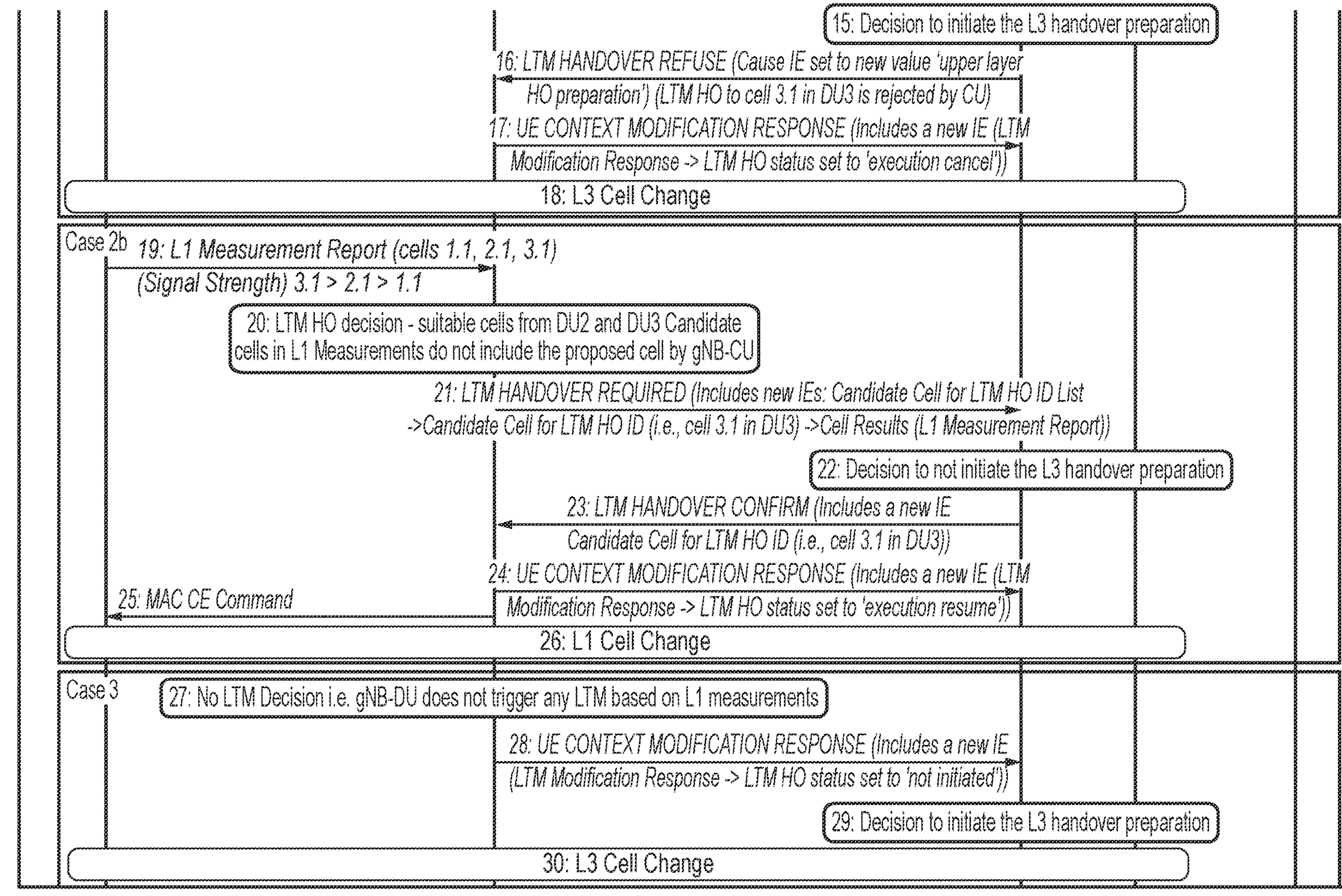

FIG. 3 shows the Call Flow or signalling diagram for alternative 2a

Four cases can occur when the gNB-DU compares the L1 measurements received from the UE with the L3 HO information received from the gNB-CU.

The four cases start at step 6 when the gNB-DU receives the UE CONTEXT MODIFICATION REQUEST message from the gNB-CU including the LTM Modification Request IE which includes L3 HO information. The L3 HO information comprises the Candidate Cells For Handover List IE as a list of candidate cells for the handover triggered by the upper layers in the gNB-CU. The L3 HO information may also comprise an RRC Container IE which includes the MeasurementReport reported by the UE (step 12). Subsequently, the procedure for the four identified cases are as follows:

Case 1—A common cell according to L1 measurements and L3 HO information

At step 7, the gNB-DU receives the L1 Measurement Report from the UE including the L1 measurements. The L1 measurements are reported by the UE for one or more cells. The L1 measurements may comprise RSRP, RSRQ or SINR measurements.

At step 8, the gNB-DU retrieves a cell common to L1 measurements and L3 HO information.

At step 9, the gNB-DU sends a MAC CE command to the UE triggered to this common cell.

At step 10, the gNB-DU sends a CELL CHANGE message to the gNB-CU triggered to this common cell.

At step 11, the L1 Cell Change procedure is initiated.

Case 2—No common cell according to L1 measurements and L3 HO information

Case 2a—Unsuccessful DU-initiated LTM handover procedure.

At step 12, the gNB-DU receives the L1 Measurement Report from the UE including the L1 measurements. The L1 measurements are reported by the UE for one or more cells. The L1 measurements may comprise RSRP, RSRQ or SINR measurements.

At step 13, the gNB-DU cannot retrieve a cell common to L1 measurements and L3 HO information.

At step 14, the gNB-DU sends the LTM HANDOVER REQUIRED message to the gNB-CU to transfer information related to the handover triggered by the lower layers in the gNB-DU. This message includes the Candidate Cell for LTM HO ID List IE. The gNB-CU should consider the Candidate Cell For LTM HO ID List IE included in the LTM HANDOVER REQUIRED message as a list of candidate cells for the handover triggered by the lower layers in the gNB-DU. These cells are identified by the included NR CGIs. The gNB-DU may send for each candidate cell the Cell Results IE including the L1 measurements relevant to this candidate cell as received from UE.

At step 15, upon reception of the LTM HANDOVER REQUIRED message and if the L1 measurements are present, the gNB-CU may compare these with the L3 measurements included in the RRC MeasurementReport message that is received from the UE (step 1). The gNB-CU also uses the Candidate Cell for LTM HO ID List IE included in LTM HANDOVER REQUIRED message. The gNB-CU decides to proceed with the L3 handover instead of the LTM handover and therefore to initiate the L3 handover preparation.

At step 16, the gNB-CU sends the LTM HANDOVER REFUSE message to the gNB-DU including the Cause IE set to 'upper layer HO preparation'.

At step 17, the gNB-DU sends the UE CONTEXT MODIFICATION RESPONSE message to the gNB-CU including the LTM Modification Response IE which includes the LTM HO status IE set to 'execution cancel'. The gNB-CU shall consider that the gNB-DU has cancelled the execution of the LTM handover.

At step 18, the L3 handover procedure initiated during step 15 continues Case 2b—Successful DU-initiated LTM handover procedure.

At step 19, the gNB-DU receives the L1 Measurement Report as in step 12.

At step 20, The gNB-DU cannot retrieve a cell common to L1 measurements and L3 HO information as in step 13.

At step 21, the gNB-DU sends the LTM HANDOVER REQUIRED message to the gNB-CU as in step 14.

At step 22, upon reception of the LTM HANDOVER REQUIRED message and if the L1 measurements are present, the gNB-CU may compare these with the L3 measurements included in the RRC MeasurementReport message that is received from the UE (step 1). The gNB-CU also uses the Candidate Cell for LTM HO ID List IE included in LTM HANDOVER REQUIRED message. The gNB-CU decides to proceed with the LTM handover instead of the L3 handover and therefore to not initiate the L3 handover preparation.

At step 23, the gNB-CU sends the LTM HANDOVER CONFIRM message to the gNB-DU including the Candidate Cell For LTM HO ID IE set as the NR CGI of the candidate cell selected by the gNB-CU for the handover triggered by the L1 layers in the gNB-DU. The gNB-DU shall consider that the gNB-CU used the L1 information in the LTM HANDOVER REQUIRED message not to initiate the preparation of a L3 handover.

At step 24, the gNB-DU sends the UE CONTEXT MODIFICATION RESPONSE message to the gNB-CU including the LTM Modification Response IE which includes the LTM HO status IE set to 'execution resume'. The gNB-CU shall consider that the gNB-DU has resumed the execution of the LTM handover.

At step 25, the gNB-DU sends a MAC CE command to the UE triggered to the cell identified by the NR CGI included in the LTM HANDOVER CONFIRM message.

At step 26, the L1 Cell Change procedure is initiated.

Case 3—L3 HO information with no L1 measurements

At step 27, the gNB-DU has not received an L1 Measurement Report with L1 measurements from the UE.

At step 28, the gNB-DU sends the UE CONTEXT MODIFICATION RESPONSE message to the gNB-CU to indicate that the LTM handover has not been initiated. This message includes the LTM Modification Response IE which includes the LTM HO status IE which is set to 'not initiated'.

Alternative 2a: Impacts on F1AP Signalling

Below are new IEs (in bold) which can be added to the following existing F1AP messages in order to enable embodiments.

UE CONTEXT MODIFICATION REQUEST

This message includes a new TS 38.473 IE called LTM Modification Request IE. Details of this are provided in table 7 FIG. 11.

If the LTM Modification Request IE is included in the UE CONTEXT MODIFICATION REQUEST message, the gNB-DU shall consider this upper layers information for lower layers triggered handover.

If the Candidate Cells For Handover List IE is included in the UE CONTEXT MODIFICATION REQUEST message, the gNB-DU shall consider that the candidate cells for handover should be compared with other cells reported by lower layers for lower layer triggered handover. These cells are identified by the included NR CGIs.

If the RRC Container IE is included in the UE CONTEXT MODIFICATION REQUEST message, the gNB-DU may use it for the indication of measurement results by the upper layers at the UE. The gNB-DU may use the RRC Container IE if present for the comparison between the cells reported by the UE to the lower layers of the gNB-DU and the cells reported by the UE to the upper layers of the gNB-CU.

Note-2: after the gNB-CU-CP receives the MeasurementReport message from the UE, two signalling formats are possible:

1. The gNB-CU-CP sends the MeasurementReport message in an RRC Container IE which is then decoded by the gNB-DU or
2. The gNB-CU-CP decodes the MeasurementReport message and build a Cell Results IE under the Candidate Cells For Handover List IE as described for the LTM HANDOVER REQUIRED message

UE CONTEXT MODIFICATION RESPONSE

This message includes a new TS 38.473 IE called LTM Modification Response IE. Details of this are provided in table 8, FIG. 12.

If the LTM Modification Response IE is included in the UE CONTEXT MODIFICATION RESPONSE message, the gNB-CU shall consider the gNB-DU has received the upper layers information for lower layer triggered handover.

If the LTM HO status IE is included in the UE CONTEXT MODIFICATION RESPONSE message, the gNB-CU shall consider that the gNB-DU has not initiated the handover triggered by lower layers or has used upper layers information to resume or cancel the execution of the handover triggered by lower layers.

Below is the list of F1AP messages which are same as Alternative 1.

LTM HANDOVER REQUIRED (see Alternative 1)

LTM HANDOVER REFUSE (see Alternative 1)

LTM HANDOVER CONFIRM (see Alternative 1)

Alternative 2b: Second Way of Reusing Existing F1AP Messages.

Figure 4:
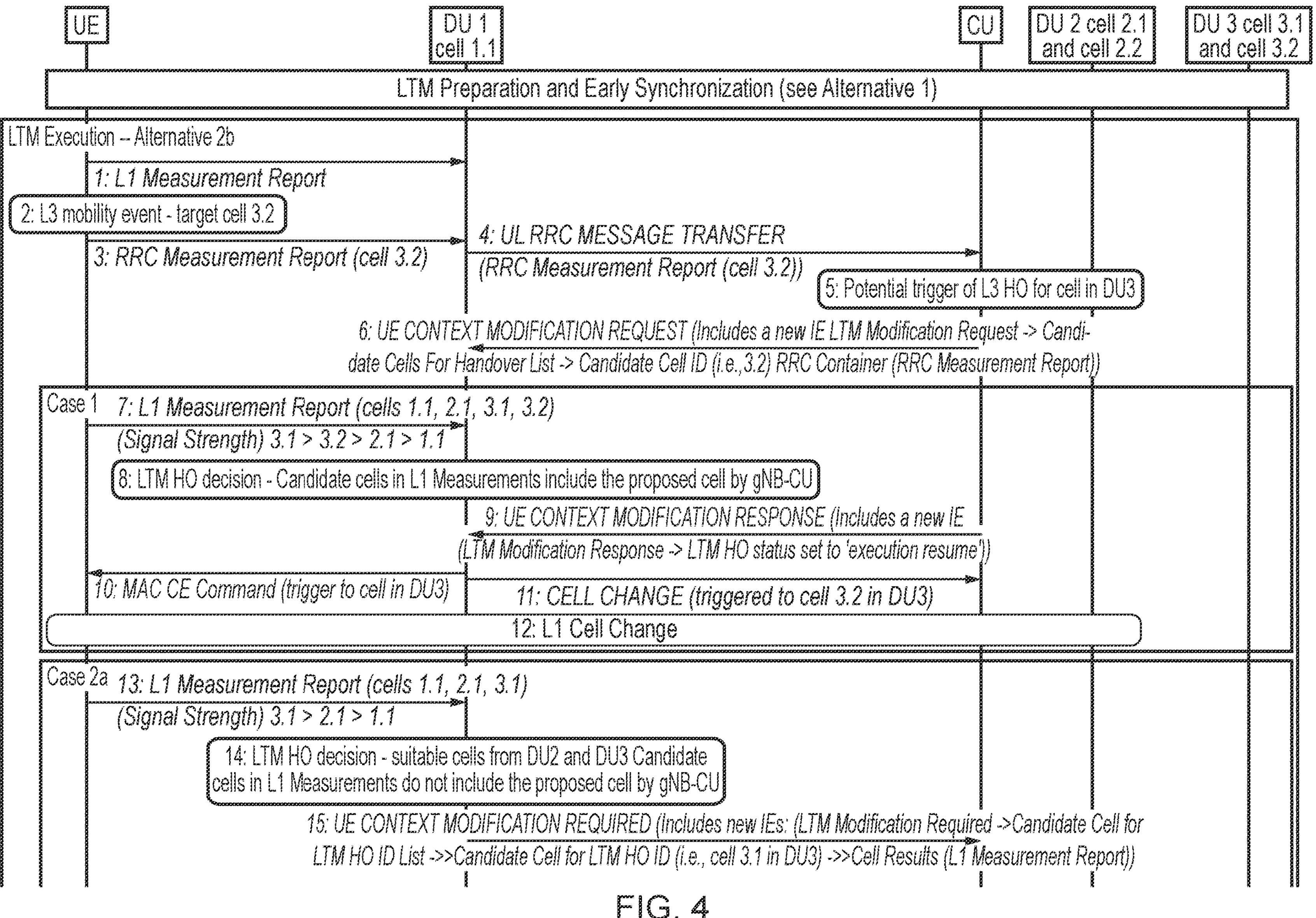
FIG. 4 illustrates a signalling diagram for the LTM procedure that reuses existing f1AP messages according to a further embodiment.
Figure 4:
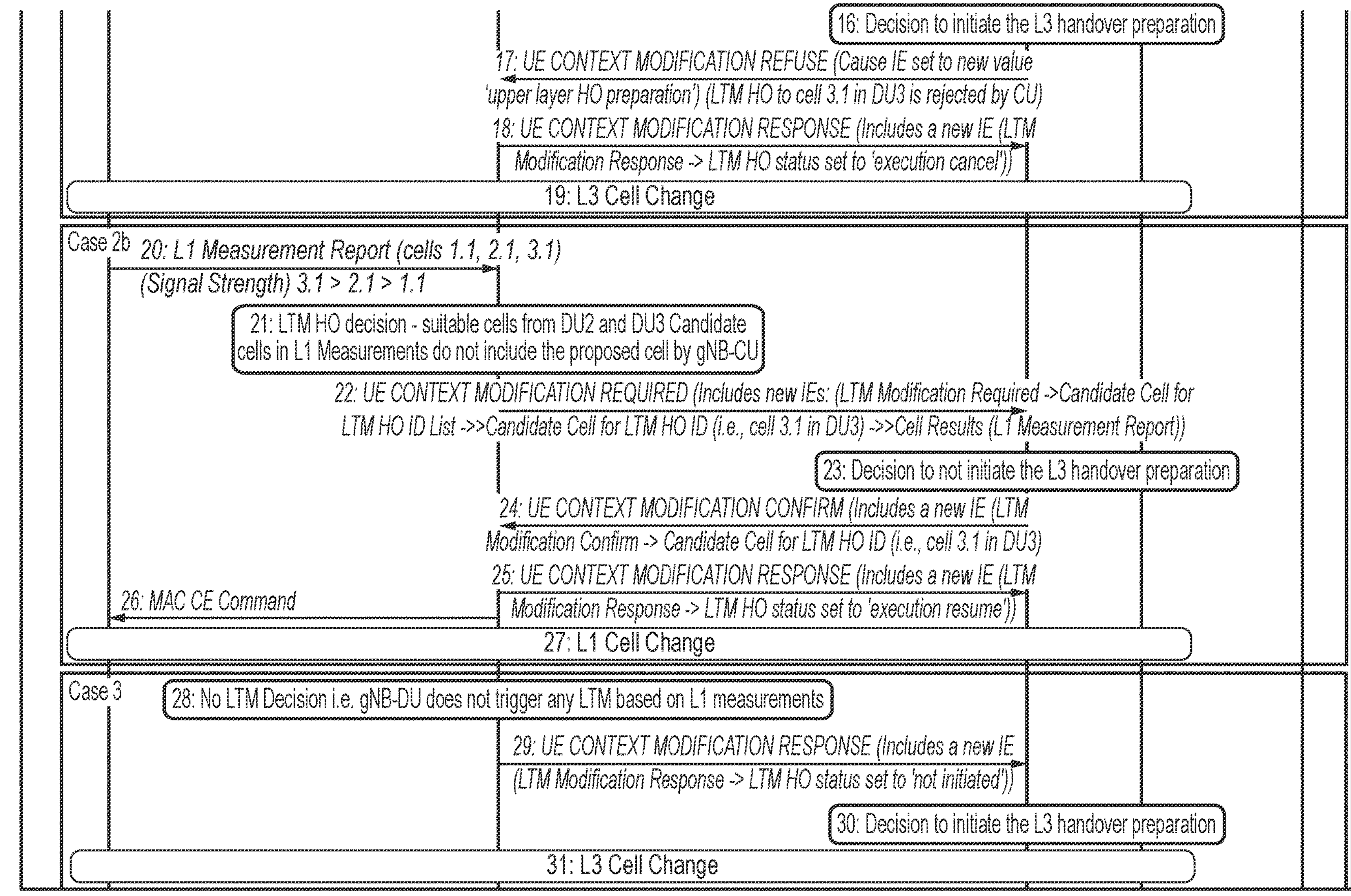

FIG. 4 shows the call Flow or signalling diagram for Alternative 2b.

Four cases can occur when the gNB-DU compares the L1 measurements received from the UE with the L3 HO information received from the gNB-CU.

The four cases start at step 6 when the gNB-DU receives the UE CONTEXT MODIFICATION REQUEST message from the gNB-CU including the LTM Modification Request IE which includes L3 HO information. The L3 HO information comprises the Candidate Cells For Handover List IE as a list of candidate cells for the handover triggered by the upper layers in the gNB-CU. The L3 HO information may also comprise an RRC Container IE which includes the MeasurementReport reported by the UE (step 12). Subsequently, the procedure for the four identified cases are as follows:

Case 1—A common cell according to L1 measurements and L3 HO information

At step 7, the gNB-DU receives the L1 Measurement Report from the UE including the L1 measurements. The L1 measurements are reported by the UE for one or more cells. The L1 measurements may comprise RSRP, RSRQ or SINR measurements.

At step 8, the gNB-DU retrieves a cell common to L1 measurements and L3 HO information.

At step 9, the gNB-DU sends a UE CONTEXT MODIFICATION RESPONSE message to the CU which includes the LTM Modification Response IE where LTM HO status IE is set to 'execution resume'.

At step 10, the gNB-DU sends a MAC CE command to the UE triggered to this common cell.

At step 11, the gNB-DU sends a CELL CHANGE message to the gNB-CU triggered to this common cell.

At step 12, the L1 Cell Change procedure is initiated.

Case 2—No common cell according to L1 measurements and L3 HO information

Case 2a—Unsuccessful DU-initiated LTM handover procedure.

At step 13, the gNB-DU receives the L1 Measurement Report from the UE including the L1 measurements. The L1 measurements are reported by the UE for one or more cells. The L1 measurements may comprise RSRP, RSRQ or SINR measurements.

At step 14, the gNB-DU cannot retrieve a cell common to L1 measurements and L3 HO information.

At step 15, the gNB-DU sends the UE CONTEXT MODIFICATION REQUIRED message to the gNB-CU to transfer information related to the handover triggered by the lower layers in the gNB-DU. This message includes the LTM Modification Required IE which includes the Candidate Cell for LTM HO ID List IE. The gNB-CU should consider the Candidate Cell For LTM HO ID List IE included in the UE CONTEXT MODIFICATION REQUIRED message as a list of candidate cells for the handover triggered by the lower layers in the gNB-DU. These cells are identified by the included NR CGIs. The gNB-DU may send for each candidate cell the Cell Results IE including the L1 measurements relevant to this candidate cell as received from UE.

At step 16, upon reception of the UE CONTEXT MODIFICATION REQUIRED message and if the L1 measurements are present, the gNB-CU may compare these with the L3 measurements included in the RRC MeasurementReport message that is received from the UE (step 1). The gNB-CU also uses the Candidate Cell for LTM HO ID List IE included in UE CONTEXT MODIFICATION REQUIRED message. The gNB-CU decides to proceed with the L3 handover instead of the LTM handover and therefore to initiate the L3 handover preparation.

At step 17, the gNB-CU sends the UE CONTEXT MODIFICATION REFUSE message to the gNB-DU including the Cause IE set to 'upper layer HO preparation'.

At step 18, the gNB-DU sends the UE CONTEXT MODIFICATION RESPONSE message to the gNB-CU including the LTM Modification Response IE which includes the LTM HO status IE set to 'execution cancel'. The gNB-CU shall consider that the gNB-DU has cancelled the execution of the LTM handover.

At step 19, the L3 handover procedure initiated during step 15 continues.

Case 2b—Successful DU-initiated LTM handover procedure.

At step 20, the gNB-DU receives the L1 Measurement Report as in step 13.

At step 21, the gNB-DU cannot retrieve a cell common to L1 measurements and L3 HO information as in step 14.

At step 22, the gNB-DU sends the UE CONTEXT MODIFICATION REQUIRED message to the gNB-CU as in step 15.

At step 23, upon reception of the UE CONTEXT MODIFICATION REQUIRED message and if the L1 measurements are present, the gNB-CU may compare these with the L3 measurements included in the RRC MeasurementReport message that is received from the UE (step 1). The gNB-CU also uses the Candidate Cell for LTM HO ID List IE included in UE CONTEXT MODIFICATION REQUIRED message. The gNB-CU decides to proceed with the LTM handover instead of the L3 handover and therefore to not initiate the L3 handover preparation.

At step 24, the gNB-CU sends the UE CONTEXT MODIFICATION CONFIRM message to the gNB-DU including the LTM Modification Confirm IE which includes the Candidate Cell For LTM HO ID IE set as the NR CGI of the candidate cell selected by the gNB-CU for the handover triggered by the L1 layers in the gNB-DU. The gNB-DU shall consider that the gNB-CU used the L1 information in the UE CONTEXT MODIFICATION REQUIRED message not to initiate the preparation of a L3 handover.

At step 25, the gNB-DU sends the UE CONTEXT MODIFICATION RESPONSE message to the gNB-CU including the LTM Modification Response IE which includes the LTM HO status IE set to 'execution resume'. The gNB-CU shall consider that the gNB-DU has resumed the execution of the LTM handover.

At step 26, the gNB-DU sends a MAC CE command to the UE triggered to the cell identified by the NR CGI included in the LTM HANDOVER CONFIRM message.

At step 27, the L1 Cell Change procedure is initiated.

Case 3—L3 HO information with no L1 measurements

At step 28 the gNB-DU has not received an L1 Measurement Report with L1 measurements from the UE.

At step 29, the gNB-DU sends the UE CONTEXT MODIFICATION RESPONSE message to the gNB-CU to indicate that the LTM handover has not been initiated. This message includes the LTM Modification Response IE which includes the LTM HO status IE which is set to 'not initiated'.

At step 30 the CU makes a decision to initiate the L4 handover preparation.

At step 31 L3 cell change occurs.

Figure 13:
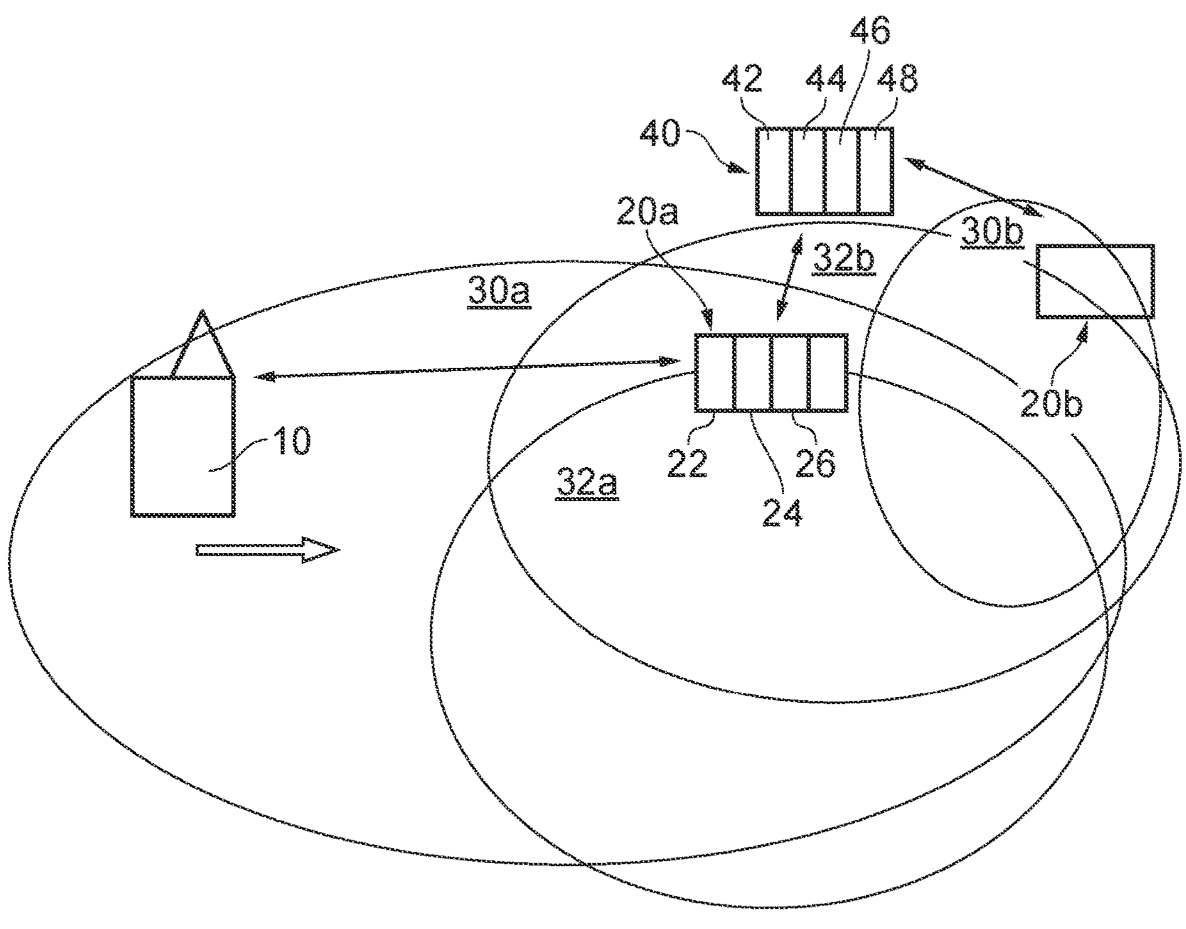
FIG. 13 schematically shows a communication network according to an embodiment.

FIG. 13 schematically shows a wireless communications network according to an embodiment where a UE 10 is moving through the cells of this wireless network. Currently it is in cell 30*a* which is provided by distributed unit DU 20*a* and it is in the vicinity of cell 32*a* provided by distributed unit 20*a* and cell 30*b* and 32*b* provided by distributed unit 20*b*. Distributed units 20*a* and 20*b* are supported by central unit CU 40.

Lower layer triggered mobility preparation and early synchronisation is performed and the user equipment 10 transmits a L1 measurement report to distributed unit 20*a*.

Transmitting and receiving circuitry 22 at DU 20*a* receives the report forwards the report to CU 40 where it is received by transmitting and receiving circuitry 42. CU 40 will communicate using transmitting and receiving circuitry 42 with other distributed units including distributed unit 20*b* and receives configuration information for the cells 30*b* and 32*b* supported by DU 20*b*. CU 40 forwards this information to the UE as an RRC reconfiguration message.

LTM may then proceed and user equipment 10 will transmit an L1 measurement report to DU 20*a*. An L3 mobility event may be detected at the UE 10 and may indicate that the UE 10 should target cell 32*b* and UE 10 will then send a layer 3 RRC measurement report for cell 32*b* to the distributing unit DU 20*a* which will forward this to the central unit CU 40. Determining circuitry 48 at CU 40 may then determine a potential trigger for a handover to a cell supported by DU 20*b* and message generating circuitry 46 may generate a handover information message. The DU 20*a* may then receiving L3 handover information from the CU 40 which will include candidate cells for a handover and in some cases an RRC measurement report. Mobility control circuitry 24 within DU 20*a* will then consider both the L3 measurements and the L1 measurements and where there is a common cell will select this common cell for a handover. Message generating circuitry 26 will then generate a MAC CE command to trigger the cell change to the selected target cell at the UE 10 and message generating circuitry 26 will also generate a cell change message which will be transmitted by transmitting and receiving circuitry 22 to CU 40.

Where there is not a common cell mobility control circuitry 24 within DU 20*a* will make a lower layer handover decision based on the candidate cells in the L1 measurements and will generate a message at message generating circuitry 26 for transmission to CU 40 indicating that a LTM handover is required. It will include candidate cells for that handover and L1 measurements.

Determining circuitry 48 within CU 40 will then determine whether or not the LTM should proceed. If it determines from the measurements that it should proceed message generating circuitry 46 will generate either an LTM handover confirm indicating the LTM is to proceed or it will generate a LTM handover refuse not and mobility control circuitry 44 will then manage a layer 3 handover.

In a further embodiment where there is no LTM determined within DU 20*a*, there are perhaps no L1 measurements, then the message generating circuitry 26 will generate a message indicating that LTM handover status is set to not initiate and mobility control circuitry 44 will then manage a layer 3 handover.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods. The term non-transitory as used herein, is a limitation of the medium itself (i.e., tangible, not a signal) as opposed to a limitation on data storage persistency (e.g. RAM vs ROM).

As used in this application, the term "circuitry" may refer to one or more or all of the following:

(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although example embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A distributed unit of an access network node, said distributed unit being for supporting radio coverage via a cell and for providing access to said cell to a user equipment, said distributed unit comprising:

mobility control circuitry configured:

based at least partially on receipt of layer 3 handover information for the user equipment, from a central unit of said access network node and where said mobility control circuitry has access to layer 1 measurements for said user equipment, to determine whether there is at least one common cell that is indicated as a candidate cell from said layer 3 handover information and as a candidate cell from said layer 1 measurements; and based on there being the at least one common cell, to select one of the at least one common cell as a cell for a handover in dependence upon said layer 3 handover information and said layer 1 measurements.

2. The distributed unit according to claim 1, wherein said layer 3 handover information comprises a plurality of identifiers identifying candidate cells.

3. The distributed unit according to claim 2, wherein said layer 3 handover information further comprises measurement information for said candidate cells.

4. The distributed unit according to claim 1, wherein said mobility control circuitry is configured based at least partially on determining no common candidate cells from said layer 1 measurements and said layer 3 information, to select as a potential target cell a candidate cell indicated from said layer 1 measurements; and said distributed unit further comprising message generating circuitry, said message generating circuitry being configured based at least partially on said mobility control circuitry selecting said potential target cell, to generate a message for transmission to said central unit, said message indicating that a lower layer handover to said potential target cell is requested.

5. The distributed unit according to claim 4, said mobility control circuitry being configured, based at least partially on receipt of a message indicating the lower layer handover has been accepted from said central unit, to select said potential target cell as said cell for said handover.

6. The distributed unit according to claim 1, further comprising message generating circuitry, said message generating circuitry being configured based at least partially on said mobility control circuitry selecting the one of the at least one common cell as the cell for said handover, to generate a control command to trigger the handover to said selected cell for transmission to said user equipment.

7. The distributed unit according to claim 1, said mobility control circuitry being configured where said mobility control circuitry does not have access to the layer 1 measurements for said user equipment, to control message generating circuitry to generate a message indicating lower layer triggered mobility is not initiated for said user equipment.

8. A central unit for controlling a plurality of distributed units comprising:

determining circuitry configured:

to determine from layer 3 user equipment measurement information, candidate cells for a cell handover for a user equipment; and based at least partially on receipt of a lower layer triggered mobility required message received from a distributed unit, to determine whether to allow or refuse a lower layer triggered handover;

message generating circuitry configured:

to generate a message for transmission to the distributed unit supporting a cell providing radio coverage to said user equipment, said message comprising information relating to said cell handover; and based at least partially on a determination whether to allow or refuse the lower layer triggered handover, to generate one of a lower layer triggered handover refused message or a lower layer handover confirmed message;

transmitting circuitry configured to transmit said message to said distributed unit; and mobility control circuitry configured to initiate layer 3 handover preparations based, at least partially, on a determination to refuse said lower layer triggered handover.

9. The central unit according to claim 8, wherein said information relating to said cell handover comprises a plurality of identifiers identifying candidate cells.

10. The central unit according to claim 9, wherein said information relating to said cell handover further comprises measurement information for said candidate cells.

11. The central unit according to claim 8, wherein said message generating circuitry is configured to generate said message in response to at least one of the following:

said determining circuitry at said central unit detecting a condition for triggering a layer 3 handover;

a predetermined time having elapsed; or preparation steps performed for preparing lower layer triggered mobility for said user equipment.

12. The central unit according to claim 8, wherein said lower layer triggered mobility required message comprises at least one identifier for at least one candidate cell for lower layer triggered mobility and a respective at least one layer 1 measurement report for said at least one candidate cell, said determining circuitry being configured to determine based at least partially on said respective at least one layer 1 measurement report and the layer 3 measurement information a target cell for said cell handover.

13. The central unit according to claim 12, wherein said at least one identifier comprises one identifier identifying a preferred candidate cell from said layer 1 measurements and said respective at least one layer 1 measurement.

14. The central unit according to claim 8, wherein said mobility control circuitry is configured, based at least partially on a message indicating receipt of an indication that lower layer triggered mobility is not initiated for said user equipment, to initiate the layer 3 handover preparations.

15. The central unit according to claim 8, wherein said mobility control circuitry is configured to initiate the layer 3 handover preparations controlling said message generating circuitry to by generate a layer 3 handover command for triggering cell change at said user equipment.

16. A method performed with a distributed unit of an access network node, said distributed unit being for supporting radio coverage via a cell and for providing access to said cell to a user equipment, said method comprising:

based at least partially on layer 3 handover information for the user equipment, from a central unit of said access network node and where said distributed unit has access to layer 1 measurements for said user equipment, determining whether there is at least one common cell that is indicated as a candidate cell from said layer 3 handover information and as a candidate cell from said layer 1 measurements; and based on there being the at least one common cell, selecting one of the at least one common cell as a cell for a handover in dependence upon said layer 3 handover information and said layer 1 measurements.

17. The method according to claim 16, wherein said layer 3 handover information comprises a plurality of identifiers identifying candidate cells.

18. The method according to claim 17, wherein said layer 3 handover information further comprises measurement information for said candidate cells.

19. The method according to claim 16, further comprising:

based at least partially on determining no common candidate cells from said layer 1 measurements and said layer 3 information, selecting as a potential target cell a candidate cell indicated from said layer 1 measurements; and based at least partially on said mobility control circuitry selecting said potential target cell, generating a message for transmission to said central unit, said message indicating that a lower layer handover to said potential target cell is requested.

* * * * *